United States Patent [19]

Cheung

[11] 4,258,386
[45] Mar. 24, 1981

[54] TELEVISION AUDIENCE MEASURING SYSTEM

[76] Inventor: Shiu H. Cheung, 95B Robinson Rd., Hong Kong, Hong Kong

[21] Appl. No.: 955,802

[22] Filed: Oct. 30, 1978

[30] Foreign Application Priority Data

Jul. 31, 1978 [GB] United Kingdom ............... 31747/78

[51] Int. Cl.³ .............................................. H04N 7/00
[52] U.S. Cl. .................................... 358/84; 179/2 AS; 455/2
[58] Field of Search ....................... 179/2 AS; 358/84; 325/31, 308; 455/2

[56] References Cited

U.S. PATENT DOCUMENTS

| 3,126,513 | 3/1964  | Kamen ............................... 179/2 AS |
| 3,483,327 | 12/1969 | Schwartz ........................... 179/2 AS |
| 3,676,580 | 7/1972  | Beck .................................... 358/84 |
| 3,803,349 | 4/1974  | Watanabe ............................. 325/31 |
| 3,849,729 | 11/1974 | Van Baggem ........................ 325/31 |
| 3,891,802 | 6/1975  | Bartelink .......................... 179/2 AS |
| 3,906,450 | 9/1975  | Prado ................................ 179/2 AS |
| 3,950,618 | 4/1976  | Bloisi ............................... 179/2 AS |
| 4,008,369 | 2/1977  | Theurer ............................... 358/84 |
| 4,115,807 | 9/1978  | Pires .................................. 358/84 |
| 4,170,782 | 10/1979 | Miller ............................... 179/2 AS |

Primary Examiner—Howard W. Britton
Attorney, Agent, or Firm—Kinzer, Plyer, Dorn & McEachran

[57] ABSTRACT

Apparatus for television audience analysis comprising means for monitoring a television receiver, means responsive to a monitored signal for storing information representative of channel identification and of the time at which a channel is selected and at which the selection of a channel is terminated, and means for reading the stored information periodically.

7 Claims, 7 Drawing Figures

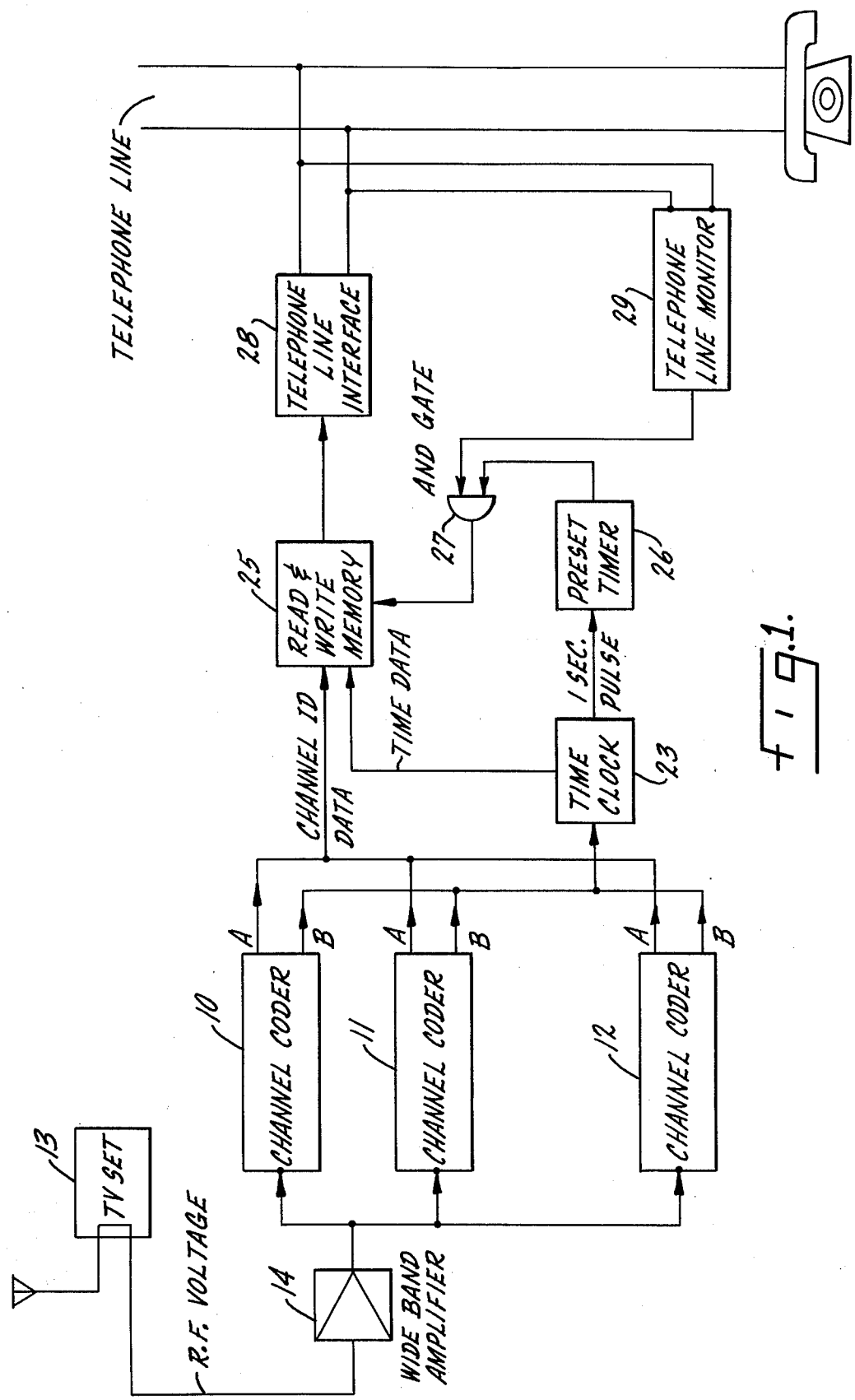

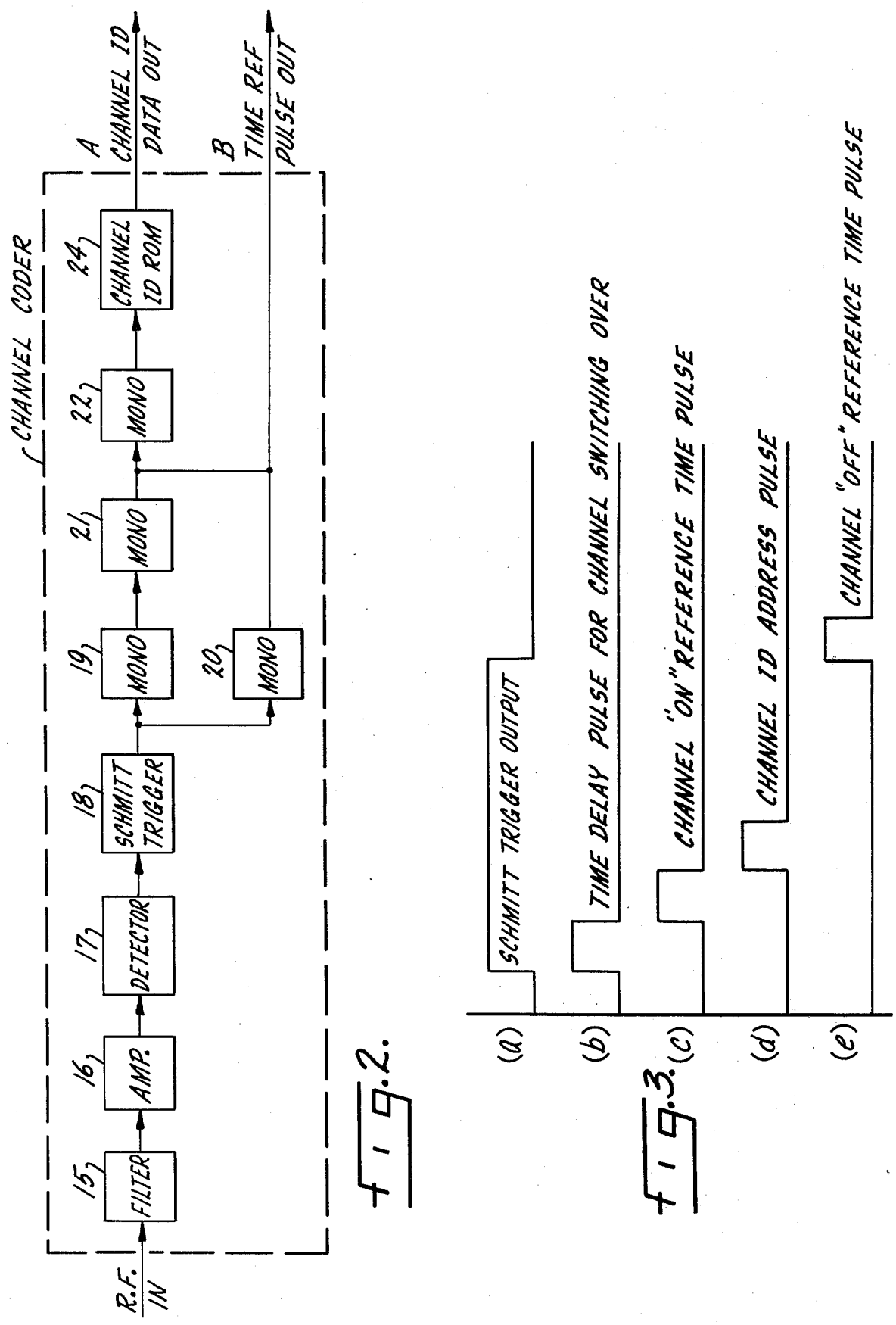

TELEVISION AUDIENCE MEASURING SYSTEM

This invention relates to a method and apparatus for television audience analysis.

According to one aspect of the present invention there is provided a method of television audience analysis comprising the steps of monitoring a television receiver, storing information representative of channel identification and of the time at which a channel is selected and at which selection of a channel is terminated and reading the stored information periodically.

Preferably, the stored information is transferred periodically to a remote analysis station such as by means of a telephone line.

Conveniently, reading of the information is inhibited during other use of the telephone line.

According to a further aspect of the present invention there is provided apparatus for television audience analysis comprising means for monitoring a television receiver, means responsive to a monitored signal for storing information representative of channel identification and of the time at which a channel is selected and at which the selection of a channel is terminated and means for reading the stored information periodically.

Preferably, the monitoring means comprises a plurality of band pass filters connectable to a television receiver, each of said filters having a band width selected for passing a signal representative of a specific channel of the receiver.

Preferably, the apparatus includes a plurality of signal generators responsive to the monitored signal for supplying to a store a coded signal indicative of a selected channel of the receiver.

Preferably, the apparatus includes a time clock generator responsive to the monitored signal for feeding a time coded signal to the store when a channel is selected and when selection of a channel is terminated.

Preferably, means are provided for transferring the stored information periodically to a line in communication with a remote analysis station.

The aforesaid line may be a telephone line in which case, advantageously, means are provided for inhibiting the transfer of information to the telephone line during other use of the line.

Conveniently, the apparatus further includes delay means for providing a pre-selected delay between the moment of selection of a channel and the feeding to the store of information representative of the channel identification and the time at which the channel is selected.

The invention will now be more particularly described with reference to the accompanying drawings wherein:

FIG. 1 is a schematic block diagram of one embodiment of apparatus according to the present invention, FIG. 2 is a block diagram of part of the apparatus illustrated in FIG. 1, and FIGS. 3(a) to (e) show an example of a timing sequence and waveforms at various points of the circuit shown in FIGS. 1 and 2.

Referring to FIG. 1 of the drawings, the apparatus shown therein comprises a plurality (as shown three) of channel monitoring and coding units 10, 11 and 12, which are connected to a television receiver 13, by way of a wide band amplifier 14 for detecting the local oscillator radio frequency voltage of the receiver 13. In practice, the number of units 10, 11 and 12 provided may correspond to the number of channels available at the television receiver.

Each unit 10, 11 and 12 includes a band pass filter 15 having a band width for passing a pre-selected channel frequency. The output of the filter 15 is connected to the input of amplifier 16, the output of which is connected to a detector 17. The output of the detector 17 is connected through a Schmitt trigger circuit 18 to first and second monostable multivibrators 19 and 20 which are arranged to be triggered respectively by the leading and trailing edges of an output pulse from the Schmitt trigger circuit 18. The output of the monostable multivibrator 19 is connected to the input of a third monostable multivibrator 21, the output of which is connected to the input of a fourth monostable multivibrator 22 and together with the output of the monostable multivibrator 20 to an input of a time clock generator 23 (see FIG. 1). The output of the monostable multivibrator 21 is connected through a channel identification read only memory 24 to a store in the form of a read and write memory 25, to which the time clock generator 23 is also connected.

The units 10, 11 and 12 are similar to each other apart from filters 15 which have bandwidths for passing signals of different frequency and the channel identification read only memories 24 which generate different signals indicative of the receiver channel with which each is associated.

When the television receiver 13 is switched on, depending upon the channel selected at the receiver, the band pass filter of one of the units 10, 11 and 12 will pass the signal through its associated amplifier 16 to the associated detector 17. The signal fed to the Schmitt trigger circuit 18 will cause the voltage output of the latter to change level defining the leading edge of an output pulse and this level will be maintained until selection of the channel is terminated whereupon the output voltage of the Schmitt trigger will revert to its previous level defining a trailing edge of an output pulse (see FIG. 3a). As stated previously, the leading edge of the output pulse from the Schmitt trigger triggers the monostable multivibrator 19 which produces an output pulse of predetermined length (see FIG. 3b). The trailing edge of the output pulse of the monostable multivibrator 19 is arranged to trigger the monostable multivibrator 20 which also produces an output pulse of predetermined length (see FIG. 3c), this output pulse being fed to the time clock generator 23 which then feeds to the read and write memory 25 a coded information signal representing the time at which the particular channel is selected at the receiver 13. The monostable multivibrator 19 serves as a delay circuit enabling the read and write memory 25 to store a signal representative of the time at which any selection of a previous channel is terminated prior to receiving a signal representative of the time at which the current channel is selected. The output of the monostable vibrator 21 also triggers the monostable multivibrator 22 which issues an address signal to the channel identification read only memory 24 which in turn supplies to the read and write memory 25 a signal representative of the selected channel of the receiver (see FIG. 3d).

When the channel is changed or the receiver switched off, the monostable multivibrator 20 will be triggered by the trailing edge of the Schmitt trigger output pulse and the pulse thus produced (see FIG. 3e) will cause the time clock generator 23 to feed to the read and write memory 25 a further coded signal representing the time at which the selection of the channel is terminated.

If the receiver is not switched off, but the channel changed, then one of the other units will cause information representative of the newly-selected channel to be fed to the read and write memory 25.

The time clock generator 23 also provides pulses at predetermined intervals such as at one second intervals to a preset timer 26, which is connected to the read and write memory 25 through a gate 27. The read and write memory 25 is connected to a telephone line through an interface 28, the telephone line also being connected to the gate 27 through a monitor 29.

After the preset timer 26 has counted a preselected number of pulses from the time clock generator 23, the preset timer will, through the gate 27, address the read and write memory to release all stored information through the interface 28 to the telephone line, along which the information is transferred to a remote analysis station possessed with a computer terminal.

When the telephone line is in normal use, the monitor 29 will detect an audio signal from the telephone line and disable the gate 27 to thereby prevent any signal from the preset timer 26 reaching the read and write memory 25.

The apparatus may be connected to television receivers at random and will enable television audience information to be analyzed automatically.

Although, in the apparatus above-described, only a single read and write memory is provided, a read and write memory may be provided in association with each by-pass filter 15, in which case it will be necessary only to feed to each memory information representative of the time at which a channel is selected and at which the selection of the channel is terminated. When the information is retrieved, it will be necessary to scan all the memories which may be identified in any suitable way.

What we claim is:

1. Apparatus for television audience analysis comprising means for monitoring a television receiver, said monitoring means comprising a plurality of bandpass filters connectable to a television receiver, each of said filters having a bandwidth selected for passing a signal representative of a specific channel of the receiver, means responsive to a monitored signal for storing information representative of channel identification and of the time at which a channel is selected and at which the selection of a channel is terminated, and means for reading the stored information periodically.

2. Apparatus as claimed in claim 1, wherein the apparatus includes a plurality of signal generators responsive to the monitored signal for supply to a store a coded signal indicative of the selected channel of the receiver.

3. Apparatus as claimed in claim 2, wherein the apparatus includes a time clock generator responsive to the monitored signal for feeding a time coded signal to a store when a channel is selected and when selection of a channel is terminated.

4. Apparatus as claimed in claim 3, wherein means are provided for transferring the stored information periodically to a line in communication with a remote analysis station.

5. Apparatus as claimed in claim 4, wherein said line is a telephone line.

6. Apparatus as claimed in claim 5, wherein means are provided for inhibiting the transfer of information to the telephone line during other use of the line.

7. Apparatus as claimed in claim 6, wherein the apparatus further includes means for providing a preselected delay between the moment of selection of a channel and the feeding to a store of information representative of the channel identification and the time at which the channel is selected.

* * * * *